(12) United States Patent
Lai

(10) Patent No.: US 9,308,504 B2
(45) Date of Patent: Apr. 12, 2016

(54) MICRO-BUBBLE GENERATING DEVICE

(71) Applicant: Ching-Ho Lai, Taichung (TW)

(72) Inventor: Ching-Ho Lai, Taichung (TW)

( * ) Notice: Subject to any disclaimer, the term of this patent is extended or adjusted under 35 U.S.C. 154(b) by 11 days.

(21) Appl. No.: 14/334,782

(22) Filed: Jul. 18, 2014

(65) Prior Publication Data

US 2015/0352503 A1 Dec. 10, 2015

(30) Foreign Application Priority Data

Jun. 6, 2014 (TW) .............................. 103209958 U

(51) Int. Cl.
*B01F 3/04* (2006.01)
*C02F 1/72* (2006.01)
*B01F 5/04* (2006.01)
*B01F 5/06* (2006.01)
*B01F 5/00* (2006.01)

(52) U.S. Cl.
CPC ......... *B01F 3/04106* (2013.01); *B01F 3/04099* (2013.01); *B01F 5/0415* (2013.01); *B01F 5/0694* (2013.01); *C02F 1/72* (2013.01); *B01F 2005/0017* (2013.01); *B01F 2215/0052* (2013.01); *C02F 2303/04* (2013.01)

(58) Field of Classification Search
CPC .... B01F 5/0604; B01F 5/0606; B01F 5/0646; B01F 5/0652; B01F 5/0644; B01F 3/04099; B01F 3/04106; B01F 5/0415; B01F 5/0694; B01F 2005/0017; B01F 2215/0052; C02F 1/72; C02F 2303/04
USPC ............................................. 261/76, DIG. 75
See application file for complete search history.

(56) References Cited

U.S. PATENT DOCUMENTS

| | | | | |
|---|---|---|---|---|
| 2,800,313 A * | 7/1957 | Targosh | ............... | A46B 11/066 15/29 |
| 3,734,111 A * | 5/1973 | McClintock | .......... | B01F 5/0451 137/3 |
| 7,059,591 B2 * | 6/2006 | Bortkevitch | .......... | B01F 3/0446 261/76 |
| 7,762,715 B2 * | 7/2010 | Gordon | ................. | B01F 5/0604 138/40 |
| 8,746,965 B2 * | 6/2014 | Livshits | ................ | B01F 5/0057 261/76 |
| 2004/0251566 A1* | 12/2004 | Kozyuk | ................ | B01F 3/0446 261/76 |
| 2006/0027100 A1* | 2/2006 | Kozyuk | ................ | B01F 3/0446 95/260 |
| 2006/0138039 A1* | 6/2006 | Rudolf | ................... | B01D 25/24 210/407 |

* cited by examiner

*Primary Examiner* — Charles Bushey
(74) *Attorney, Agent, or Firm* — Muncy, Geissler, Olds & Lowe, P.C.

(57) ABSTRACT

A micro-bubble generating device is provided in the present invention and a shell covers the adapter coupling head, the accelerating tube, the venturi tube and the conical net to be the micro-bubble generating device. When the water flows from the adapter coupling head to the accelerating pipe, the water will double the speed by the first water flow rotation and the second water flow rotation and guide the external ambient air via the first air flow channel and the second air flow channel into the inner tube of the accelerating tube. And then, the water will flow through the venturi tube to generate a high rotation speed and high dynamic pressure water to make the air burst. Therefore, water will produce a plurality of small bubbles. After the water flows through the cutting holes, the small bubbles are further cut to form a plurality of micron bubbles.

4 Claims, 4 Drawing Sheets

MICRO-BUBBLE GENERATING DEVICE

FIELD OF THE INVENTION

The present invention relates to a field of micro-bubble generating device, and more particularly relates to a micro-bubble generating device for purifying water.

BACKGROUND OF THE INVENTION

The idea of purifying water is to install a water purifier to clean water or implement silver material for sterilizing, and the cost is high and it requires to change filter frequently. It would generate a lot of wastewater to pollute environment. Generally, the quantity of the filtered water is not enough to supply agriculture, fishery or the like, and it can be used for drinking water only.

The conventional micro-bubble generating device can be divided into the gas dissolving type and the hydrodynamic type. The gas dissolving type is used to inject high pressure gases into the liquid and the disadvantage is the requirement of gas consumption. The cost of the gas dissolving type is high and it is not convenient to implement in different industries or household use. The hydrodynamic type is the common use type used to pump water for drawing in gas. It makes a number of high density micron bubbles dissolved in water. A vortex turbine pump is also used to hit gas into micron bubbles and make micron bubbles dissolved in water. The micro-bubble generating device described above has many disadvantages including complicated structure, large mounting space and high operating skill. It is not convenient to be used for household, medium or small size agriculture and aquaculture. In addition, since the quantity of bubbles is not sufficient and the existence time of bubbles in water is short, so it is deficient in water purification or sterilization.

According to the aforementioned drawbacks, the present invention is to provide a micro-bubble generating device with the effects of water purification, sterilization, water saving efficiency, lower demands for chemical detergents, it also can be used generally in industries, farming industries, medical, health and beauty industries or the likes.

SUMMARY OF THE INVENTION

In order to solve the aforementioned problems, an object of the present invention is to provide a micro-bubble generating device which includes an adapter coupling head including a water inlet, a water outlet and a first air flow channel, the first air flow channel is disposed within the adapter coupling head; an accelerating tube including a convex part forming in a front end of the accelerating tube, a concave part forming in a back end of the accelerating tube, a second air flow channel forming within the accelerating tube and extending from the convex part to a middle section of the accelerating tube, at least one water flow channel forming within the accelerating tube and extending from the convex part to the middle section of the accelerating tube, an inner tube forming within the accelerating tube and extending from the middle section of the accelerating tube to the concave part, at least one opening forming on a wall of the accelerating tube connects to the inner tube, and the convex part is connected with the water outlet to let the water flow channel form a route and the route is connected to the inner tube, a water flow direction from an exit of the at least one water flow channel and an axis of at least one radial direction of a circular form a first angle and the first angle is from 0° to 180° and the number of the axis of the radial direction is equal to the number of the installation of the at least one water flow channel; a venturi tube with a hollow shape and including a first inlet end, a front end section, a middle section, a back end section and a first outlet end, and the first inlet end is connected to the concave part of the accelerating tube, an internal diameter within the middle section is uniform, the internal diameter within the front end section becomes shrunken toward the middle section and the internal diameter within the back end section becomes shrunken toward the middle section; a conical net including a conical portion is connected to the back end section and the conical portion contains a plurality of cutting holes; and a shell covering the adapter coupling head, the accelerating tube, the venturi tube and the conical net; the water passes through the adapter coupling head sequentially, the accelerating tube, the venturi tube and the conical net, the water passes the water flow channel to perform a first accelerating circular motion around an external wall of the accelerating tube, and then water flows into the inner tube through the at least one opening and performs a second accelerating circular motion within the inner tube.

The convex part of the accelerating tube plugs in the water outlet of the adapter coupling head. The first inlet end of the venturi tube plugs into the concave part of the accelerating tube. The conical portion of the conical net plugs into the back end section of the venturi tube. The shell covers the adapter coupling head, the accelerating tube, the venturi tube and the conical net to form the micro-bubble generating device. When the water flows from the adapter coupling head to the accelerating pipe, the water will double its speed by the first water flow rotation and the second water flow rotation, and then it guides the external ambient air via the first air flow channel and the second air flow channel into the inner tube of the accelerating tube. Then water will flow through the venturi tube to generate a high rotation speed and high dynamic pressure to make air inside water bursted. Therefore, water will produce a plurality of small bubbles. After the water flows through the cutting holes, small bubbles are further cut by the cutting holes to form a plurality of micron bubbles.

Another object of the present invention is to provide a micro-bubble generating device with a hidden adapter coupling head to avoid contact with the external environment or human touch to affect the flow result of the first air flow channel.

One another object of the present invention is to provide a micro-bubble generating device with an accelerating tube to generate the first water flow rotation and the second water flow rotation to double its speed. Water can flow through the venturi tube and the conical net to generate micro-bubbles, which can stay in water for a long time and the diameter of the micron bubble is slight enough to possesses better detergence ability.

The micro-bubble generating device in the present invention can be used generally in industry, farming industry, medical treatment, cosmetics and so on. The micro-bubble generating device can be used as shower or kitchen faucet, water outlet of washing machine. The micro-bubble generating device possesses cleaning effects, such as water purification, beauty treatments, sterilization, water saving efficiency and reduction of chemical cleaning agents requirement. In addition, the micro-bubble generating device size is small, so it can be easily installed anywhere.

DETAILED DESCRIPTION OF THE PREFERRED EMBODIMENTS

Figure 1:
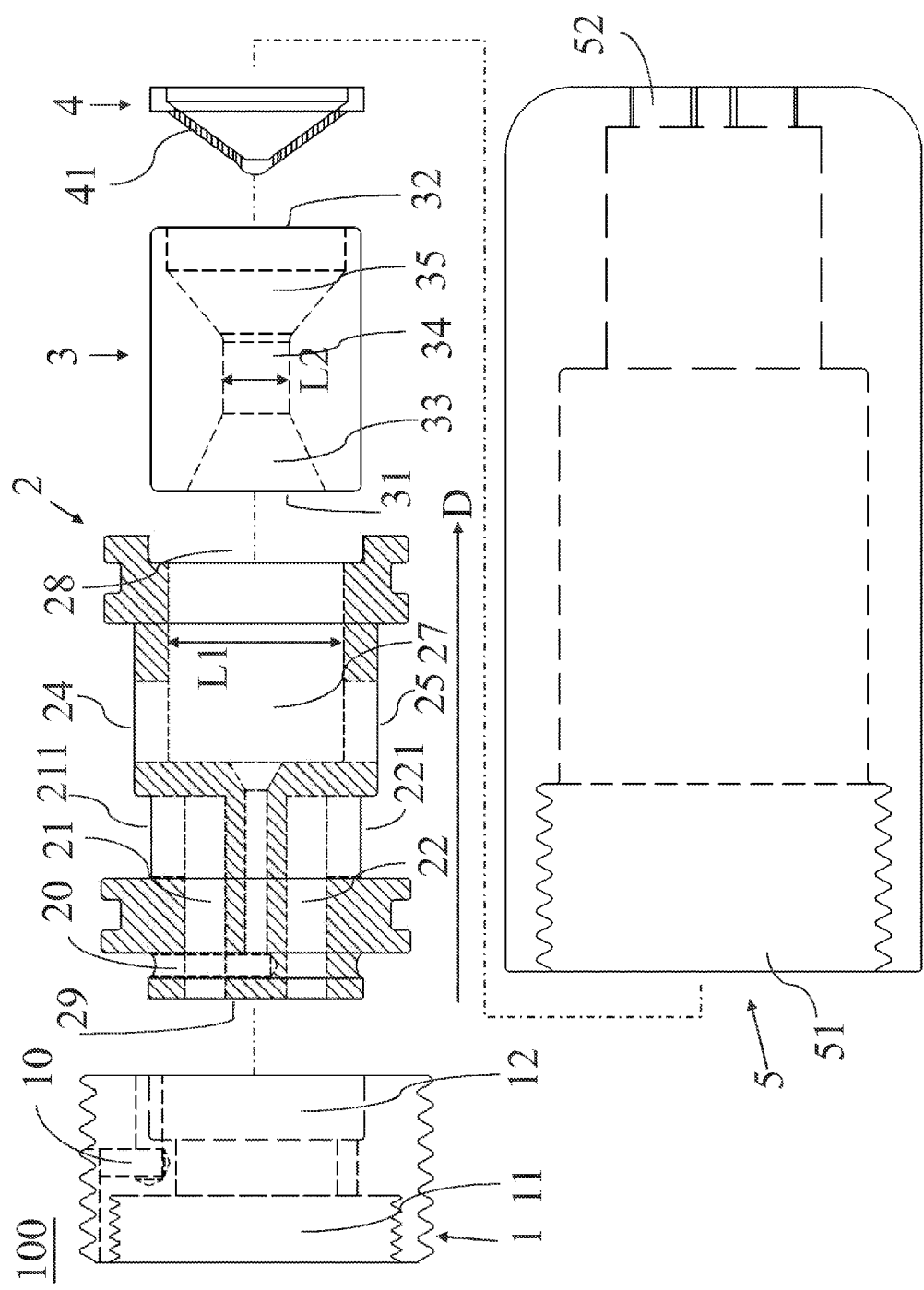
FIG. 1 is an exploded sectional view illustrating a micro-bubble generating device in the present invention.

In the following detailed description of the preferred embodiments, reference is made to the accompanying drawings which form a part hereof, and as shown by way of illustration specific embodiments in which the invention may be practiced. In this regard, directional terminology, such as "top," "bottom," "front," "back," "left," "right," "inside," "outside," "side," etc., is used with reference to the orientation of the FIG.(s) being described. As such, the directional terminology is used for purposes of illustration and is in no way limiting the present invention.

The micron bubbles generated by the micro-bubble generating device in the present invention are micron order. The micron bubbles are made by water and air and the particle size is 10 micrometer or less. The micron bubbles possess very strong detergency ability. When the micron bubbles are generated, the contact surface area between the water and air is increased and the negative charges are generated by friction. Since most of the dirty substances possess positive charges, the dirty substances will be attracted by the micron bubbles when they contact to each other. While the pressure occurred by explosion of the bubbles with natural buoyancy, the dirty substances will be removed. Since the micron bubbles are very tiny, they can penetrate through specific locations, such as pores, for deep clean. The size of the pore is about 20 to 50 micrometers or bigger (100~200 micrometers) that could be seen by human eyes. If pores filled with the dirty substance are about 400 micrometers, the micron bubbles can easily get in the pores to take the dirty substances away by the mutual attraction theory of the positive charges and the negative charges so as to achieve the deep clean result.

The micron bubbles generated by the micro-bubble generating device can also be used in sewage treatment. The charge characteristics of the micron bubbles are used to degrade sewage by effectively reducing some impurities, such as bacteria and viruses. Alternatively, the micro-bubble generating device can be used in semiconductor cleaning. The microns or even nanometers wastes in semiconductor industries can cause heavy metal pollution if discharging directly or clean-up in a wrong way. Therefore, the scattered or adsorbable micron bubbles can be added in the water to increase the surface areas contact with the wastes and adsorb the wastes to float on the surface. Also, used in agriculture or aquaculture, since the micron bubbles are very tiny and it can stay in the water for a long time, it can be used for farming and agriculture. The micron bubbles can be used as an oxygen carrier to substantially increase oxygen content in the water. In addition, because of its charge characteristics, the positive charge with nutritionally beneficial growth attracted by the negative charge is brought to animals and plants. Moreover, the micron bubbles can physiologically stimulate biological effects for organisms, so the survival rate, yield and quality can be simultaneously increased without chemical fertilizers. Accordingly, the micron bubbles can increase oxygen content, decontaminate and remove pesticide residue so as to improve yield and quality and cost down.

Please refer to FIG. 1, it is an exploded sectional view illustrating the micro-bubble generating device structure 100 in the present invention. The micro-bubble generating device 100 provided in the present invention includes an adapter coupling head 1, an accelerating tube 2, a venturi tube 3, a conical net 4, and a shell 5. The adapter coupling head 1 includes a water inlet 11, a water outlet 12 and a first air flow channel 10. The water inlet 11 can be connected with a water source or an effluent pipeline, or connected with a controller to control the flow velocity and pressure. The water flows from the water inlet 11 to the water outlet 12 and flows through the accelerating tube 2. The first air flow channel 10 is installed in an internal adapter coupling head 1 having hidden effect to avoid the contact with the external environment or human touch so as to affect the air flow in the first air flow channel 10. In addition, a separation among the first air flow channel 10, the water inlet 11 and the water outlet 12 is existed to prevent the first air flow channel 10, the water inlet 11, and the water outlet 12 affecting each other.

Figure 2:
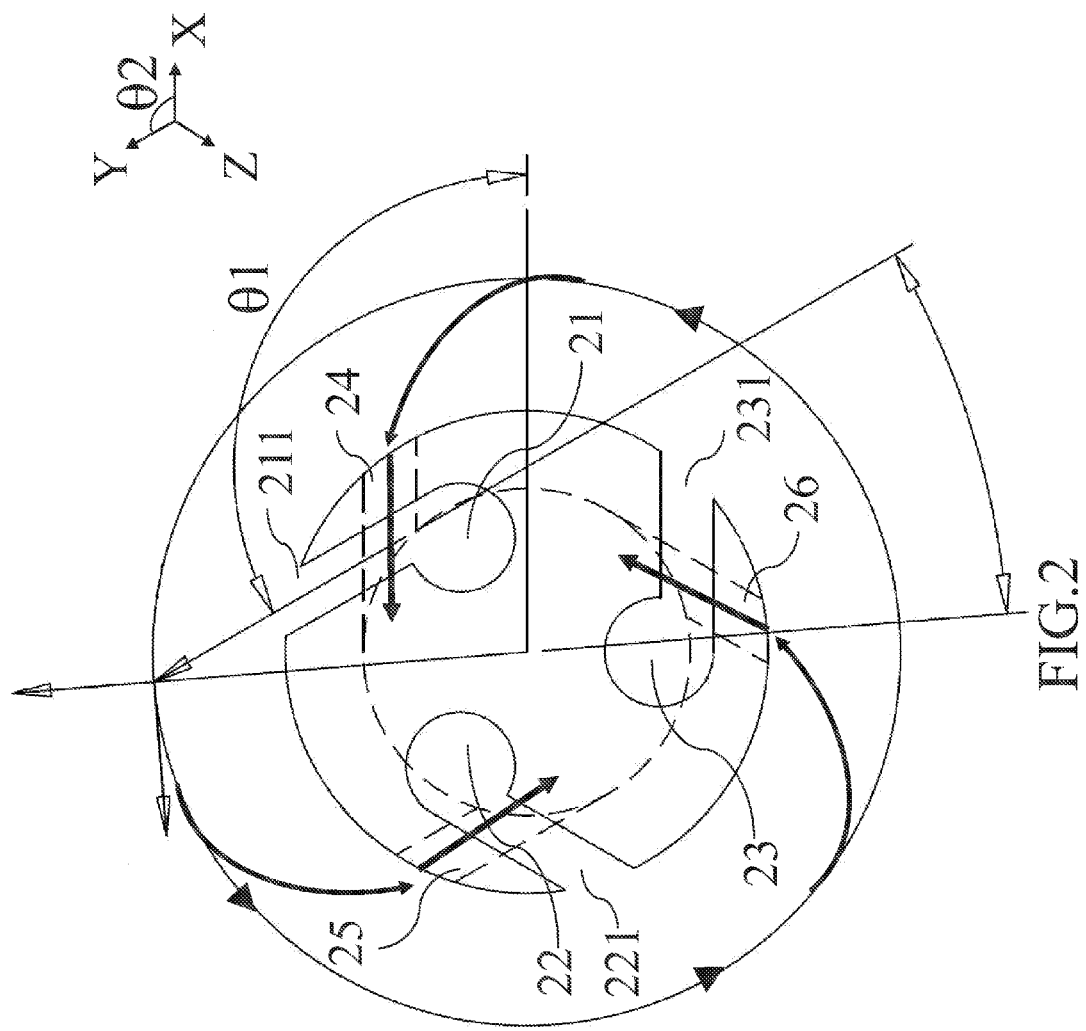
FIG. 2 is a top view along the water flow direction D of the accelerating tube in FIG. 1.

Please refer to FIGS. 1 and 2, the accelerating tube 2 includes a second air flow channel 20, a first water flow channel 21, a second water flow channel 22, a third water flow channel 23, a first opening 24, a second opening 25, a third opening 26, a concave part 28 and a convex part 29. The convex part 29 is formed in a front end of the accelerating tube 2. The second air flow channel 20 is formed within the accelerating tube 2 and extends from the convex part 29 to a middle section of the accelerating tube 2. The first water flow channel 21, the second water flow channel 22 and the third water flow channel 23 are formed within the accelerating tube 2 and extend from the convex part 29 to a middle section of the accelerating tube 2. The first opening 24, the second opening 25 and the third opening 26 are formed on a wall of the accelerating tube 2 and connected with an inner tube 27 of the accelerating tube 2. The inner tube 27 is formed within the accelerating tube 27 and extends from the middle section of the accelerating tube 2 to the concave part 28. The concave part 28 is formed in a back end of the accelerating tube 2. The convex part 29 can plug in the water outlet 12 of the adapter coupling head 1 so that the first air flow channel 10 and the second air flow channel 20 form a route. The route is leading in the inner tube 27 of the accelerating tube 2. Therefore, the air in the outer environment can input into the inner tube 27 of the accelerating tube 2 from the first air flow channel 10 to the second air flow channel 20. In addition, a separation among the second air flow channel 20, the first water flow channel 21, the second water flow channel 22, and the third water flow channel 23 is made, so the second air flow channel 20 and the water flow channels won't affect to each other. The convex part 29 plugs in the water outlet 12 of the adapter coupling head 1, so the water can flow from the water outlet 12 to one of the first 21, second 22 and third water flow channel 23. The number of channels is not limited herein, and in the preferred embodiment, the number of flow channels is three. The invention is described in three flow channels.

Figure 3:
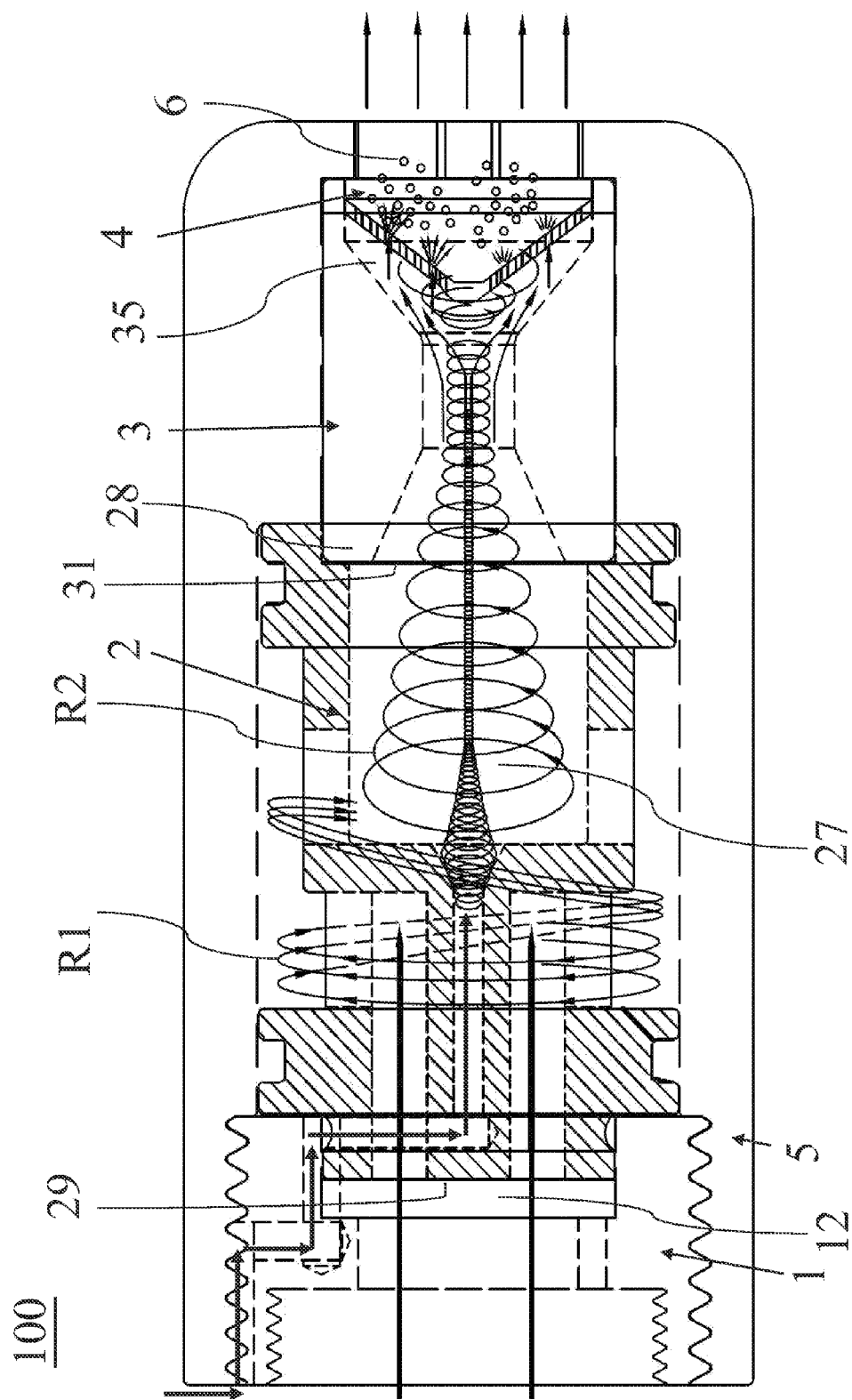
FIG. 3 is an assembled sectional view illustrating the micro-bubble generating device in the present invention.

Please see FIG. 2-3, after the water flows through outlets 211, 221 and 231 of the first water flow channel 21, the second water flow channel 22 and the third water flow channel 23, the water will perform the first accelerating circular motion around the outer wall of the accelerating tube 2 to generate a first spiral water flow rotation R1 by the centrifugal force and accelerates flowing toward the first opening 24, second opening 25 and third opening 26. Specifically, the water flow directions of the outlets 211, 221 and 231 and X, Y, Z axis form a first angle θ1 respectively and the first angle θ1 is between 0 to 180. In the preferred embodiment, the first angle θ1 is 120°. The X, Y, Z are axes in the radial direction and separate to each other with a second angle θ2, and the sum of the second angles θ2 is equal to 360°. The number of axes is based on the number of the water flow channels and the number of axes equal to the number of the water flow channels. In addition, the water from the first, second, third outlets 211, 221, 231 are not limited to flow to a specific opening. For example, the water from the first outlet 211 is not necessarily to flow to the first opening 24, it can flow to the second opening 25 or the third opening 26. The first, second and third openings 24, 25, 26 are connected with the inner tube 27 of the accelerating tube 2. When the water accelerates flowing through the first, second and third openings 24, 25, 26 toward the inner tube 27 of the accelerating tube 2, the water will perform a second accelerating circular motion in the wall of the inner tube 27 to generate a second water flow rotating R2, and then flow to the venturi tube 3. At this moment, since the high speed rotation of the water will move the air away and flow toward the water flow direction D to generate a negative pressure at the inner tube 27, the external air can flow from the first air flow channel 10 through the second flow channel 20 to the inner tube 27. When the water and the air are flowing to the same direction, the counterforce of the centrifugal force will perform the air compression. By the way, the inner tube 27 of the accelerating tube 2 includes a first inner diameter L1.

Please continue to refer to FIG. 1 and FIG. 3, the venturi tube 3 is a hollow shape and includes a first inlet end 31, a first outlet end 32, a front end section 33, a middle section 34 and a back end section 35. The first inlet end 31 can plug in the concave part 28 of the accelerating tube 2. The inner diameter of the front end section 33 is shrunk toward the middle section 34. The middle section 34 has a second inner diameter L2. The first inner diameter L1 of the inner tube 27 of the accelerating tube 2 is greater than the second inner diameter L2. The inner diameter of the back end section 25 is increased toward the first outlet end 32. When the water in the inner tube 27 of the accelerating tube 2 with the compressed air flow toward the venturi tube 3, due to the Bernoulli Effect, it will cause pressure changes to result in higher dynamic pressure so as to produce a high-speed and high dynamic pressure rotating water flow and make the air burst. Accordingly, many small bubbles are generated in water. The dynamic pressure is the kinetic energy in each particle per unit volume. According to Bernoulli's principle, in the incompressible flow field, the dynamic pressure (q) can be expressed by the following equation:

$$q = \frac{1}{2}\rho V^2$$

q: dynamic pressure (pascals)
ρ: fluid density (kg/m³)
V: flow velocity (m/s)

Figure 4:
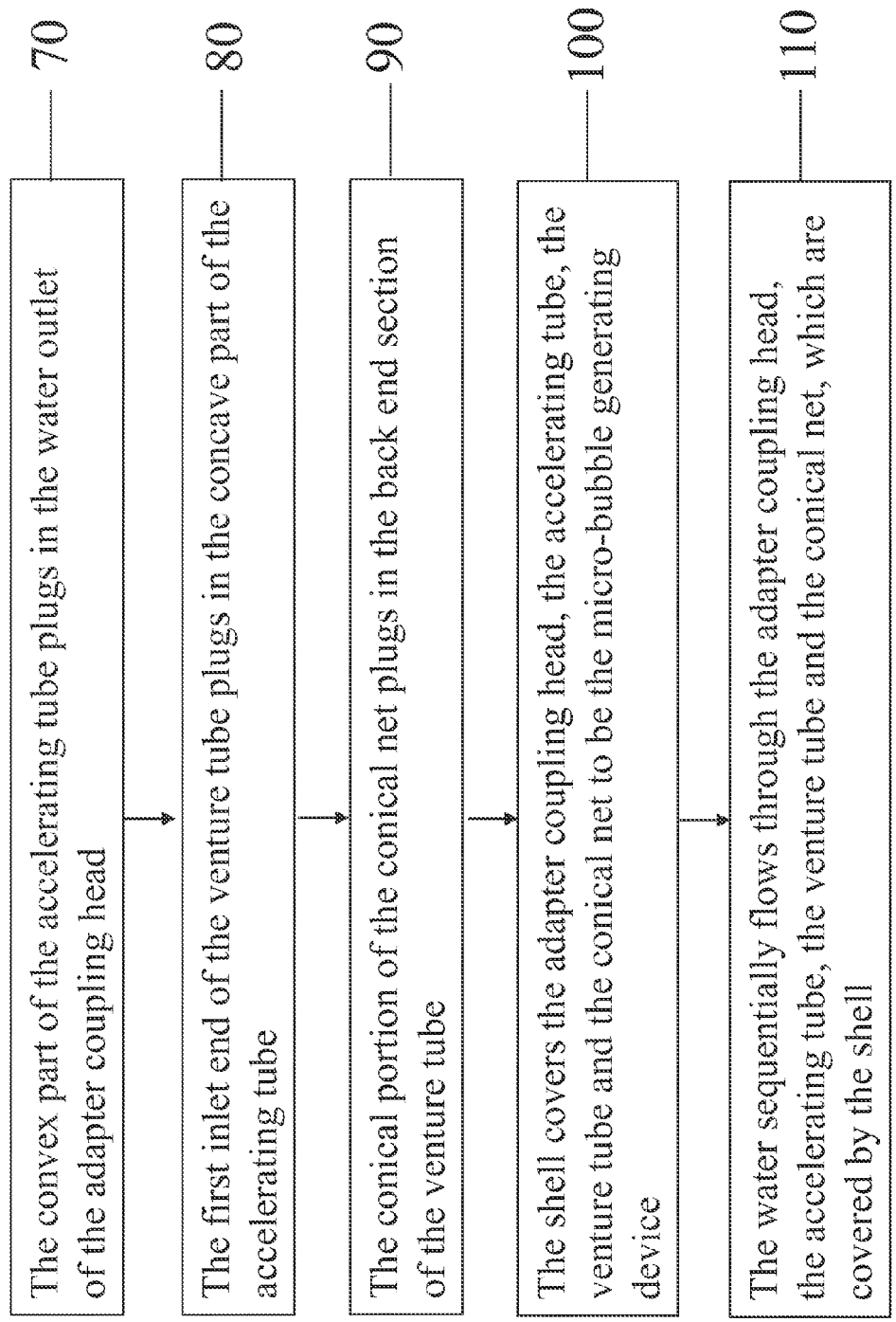
FIG. 4 is a flow chart illustrating an assembling method of the micro-bubble generating device and a manufacturing method of micro-bubbles in the present invention.

Please continue to refer to FIGS. 1, 3 and 4, the conical net 4 includes a conical shape and includes a plurality of cutting holes 41 disposed in a conical portion thereof. The diameter of the cutting holes 41 is 0.05~0.9 mm. The conical portion of the conical net 4 is connected with the back end section 35 of the venturi tube 3. When the water with high speed rotation flow through the conical net 4, the cutting holes 41 will further perform bubbles cut in water to cause the bubbles in water rapidly divided into micron bubbles 6. The diameter of the micron bubble 6 is 5~50 μm, and the numbers of micron bubbles produced in water is 400 to 1200 micron bubbles per milliliter in water.

Please continue to refer to FIG. 3, the shell 5 has a fourth opening 51 and a fifth opening 52. The shell 5 is for covering the adapter coupling head 1, the accelerating tube 2, the venturi tube 3 and the conical net 4 so that it can be assembled to be a micro-bubble generating device 100. After the shell 5 convers the adapter coupling head 1, the accelerating tube 2, the venturi tube 3 and the conical net 4, the fourth opening 51 is used to be the opening for the water inlet 11 of the adapter coupling head 1 to let the water inlet 11 be able to couple to the water source or the pipeline in the outlet. The opening 52 is used to be the outlet for the micron bubbles 6 after the water flows through the conical net 4.

Please continue to refer to FIG. 3, it is a sectional view illustrating the micro-bubble generating device 100 is the present invention. The convex part 29 of the accelerating tube 2 plugs in the water outlet 12 of the adapter coupling head 1. The first inlet end 31 of the venturi tube 3 plugs in the concave part 28 of the accelerating tube 2 and the conical portion of the conical net 4 plugs in the back end section 35 of the venturi tube 3. The shell 5 coverts the adapter coupling head 1, the accelerating tube 2, the venturi tube 3 and the conical net 4 to be a micro-bubble generating device 100. When the water flows from the adapter coupling head 1 to the accelerating tube 2, the water will double the speed by the first water flow rotation R1 and the second water flow rotation R2 and guide the external ambient air via the first air flow channel 10 and the second air flow channel 20 into the inner tube of the accelerating tube 2. And then, the water will flow through the venturi tube 3 to generate a high rotation speed and high dynamic pressure water to make the air burst. Therefore, water will produce a plurality of small bubbles. After the water flows through the cutting holes 41, the small bubbles are further cut to form a plurality of micron bubbles 6.

Please refer to FIG. 4, it is a flow chart illustrating a method to assemble the micro-bubble generating device 100 and implement the device to generate micron bubbles in the present invention and the method includes the following steps. In step 70, the convex part 29 of the accelerating tube 2 plugs in the water outlet 12 of the adapter coupling head 1, so that the first air flow channel 10 and the second air flow channel 20 forms a route. The route is leading to the inner tube 27 of the accelerating tube 2. In step 80, the first inlet end 31 of the venturi tube 3 plugs in the concave part 28 of the accelerating tube 2. In step 90, the conical portion of the conical net 4 plugs in the back end section 35 of the venturi tube 3. In step 100, the shell 5 covers the adapter coupling head 1, the accelerating tube 2, the venturi tube 3 and the conical net 4 to be the micro-bubble generating device 100. In step 110, the water sequentially flows through the adapter coupling head 1, the accelerating tube 2, the venturi tube 3 and the conical net 4, which are covered by the shell 5.

As described above, the present invention has been described with preferred embodiments thereof and it is understood that many changes and modifications to the described embodiments can be carried out without departing from the scope and the spirit of the invention that is intended to be limited only by the appended claims.

What is claimed is:

1. A micro-bubble generating device, comprising:
   an adapter coupling head including a water inlet, a water outlet and a first air flow channel, and the first air flow channel disposed within the adapter coupling head is used to guide the external ambient air;
   an accelerating tube including a convex part forming in a front end of the accelerating tube, a concave part forming in a back end of the accelerating tube, a second air flow channel forming within the accelerating tube is connected to the first air flow channel and extending from the convex part to a middle section of the accelerating tube, a water flow channel forming within the accelerating tube and extending from the convex part to the middle section of the accelerating tube, an inner tube forming within the accelerating tube and extending from the middle section of the accelerating tube to the concave part, at least one opening forming on a wall of the accelerating tube and connected within the inner tube, and the convex part is connected with the water outlet to let the water flow channel form a route and the route is connected with the inner tube, the water flow channel contains an exit which is used to generate a first spiral water flow rotation around the outer wall of the accelerating tube and the first spiral water flows rotation passes through the at least one opening forming on the wall of the accelerating tube to generate an second spiral water flow rotation in the inner tube, the second spiral water flow rotation comprises a compressed air flow from the second air flow channel, a water flow direction from the exit of the water flow channel and an axis of the radial direction of a circular form a first angle and the first angle is between 0° and 180°, the number of the axis of the radial direction is equal to the number of the installation of the water flow channel;

a venturi tube with a hollow shape and including a first inlet end, a front end section, a middle section, a back end section and a first outlet end, and the first inlet end is connected with the concave part of the accelerating tube, an internal diameter within the middle section is uniform, the internal diameter at the front end section becomes shrunken toward the middle section and the internal diameter within the back end section becomes shrunken toward the middle section;

a conical net including a conical portion connected with the back end section and the conical portion having a plurality of cutting holes, the plurality of cutting holes ia used to cut the compressed air flow from the second air flow channel to form a plurality of micron bubbles; and a shell covering the adapter coupling head, the accelerating tube, the venturi tube and the conical net;

wherein when the water sequentially passes the adapter coupling head, the accelerating tube, the venturi tube and the conical net, the water passing the water flow channel performs a first accelerating circular motion around an external wall of the accelerating tube, and flows to the inner tube from the at least one opening and performs a second accelerating circular motion within the inner tube.

2. The micro-bubble generating device according to claim 1, wherein the diameter of the plurality of cutting hole is between 0.05 to 0.9 mm.

3. The micro-bubble generating device according to claim 1, wherein the inner tube forming within the accelerating tube includes a first internal diameter, and the first internal diameter is greater than the internal diameter within the middle section of the venturi tube.

4. The micro-bubble generating device according to claim 1, wherein the number of the axis of the radial directions separate to each other with a second angle and the sum of the second angles is equal to 360°.

* * * * *